US008844400B2

(12) United States Patent
Morinaga

(10) Patent No.: US 8,844,400 B2
(45) Date of Patent: Sep. 30, 2014

(54) STEERING APPARATUS FOR VEHICLE

(71) Applicant: Aisin Seiki Kabushiki Kaisha, Kariya (JP)

(72) Inventor: Shinya Morinaga, Chiryu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 112 days.

(21) Appl. No.: 13/626,016

(22) Filed: Sep. 25, 2012

(65) Prior Publication Data

US 2013/0074638 A1 Mar. 28, 2013

(30) Foreign Application Priority Data

Sep. 26, 2011 (JP) ................................. 2011-208393

(51) Int. Cl.
*B62D 1/16* (2006.01)
*B62D 1/181* (2006.01)

(52) U.S. Cl.
CPC ...................................... *B62D 1/181* (2013.01)
USPC ............................................................ 74/495

(58) Field of Classification Search
CPC ........ B62D 1/181; B62D 1/184; B62D 1/187; B62D 1/189; B62D 1/16; B62D 1/18
USPC ............................. 74/493, 494, 495; 280/775
See application file for complete search history.

(56) References Cited

U.S. PATENT DOCUMENTS 4,633,732 A 1/1987 Nishikawa et al.
4,739,673 A * 4/1988 Ishikawa et al. ................ 74/493
5,806,890 A * 9/1998 Sugiki et al. .................. 280/775
7,331,608 B2 * 2/2008 Armstrong et al. ........... 280/775
2011/0215560 A1 9/2011 Born et al.

FOREIGN PATENT DOCUMENTS

JP 2000-280916 10/2000
JP 2009-248703 10/2009
WO 2004/041619 A1 5/2004

OTHER PUBLICATIONS

Extended European Search Report dated Jan. 22, 2013, issued by European Patent Office in corresponding European Patent Application No. 12185830.2. (4 pages).

* cited by examiner

*Primary Examiner* — Justin Krause
(74) *Attorney, Agent, or Firm* — Buchanan Ingersoll & Rooney PC

(57) ABSTRACT

A steering apparatus for a vehicle provided with a steering wheel includes a main housing, a movable column member, a fixing bracket fixing the main housing to the vehicle body, a link mechanism and a drive mechanism connected to the link mechanism, wherein the drive mechanism includes a motor, a threaded shaft rotated by the motor, and a nut member moving in an axial direction of the threaded shaft and threadedly engaged with the threaded shaft, the nut member includes a female threaded portion including two flat surface portions facing each other and parallel to the threaded shaft, the nut member includes a pivot shaft portion including a rotational axis orthogonal to an axis of the female threaded portion, the link mechanism includes a bearing portion rotatably supporting the pivot shaft portion, a spring member arranged between the bearing portion and at least one of the two flat surface portions.

12 Claims, 9 Drawing Sheets

F I G. 2
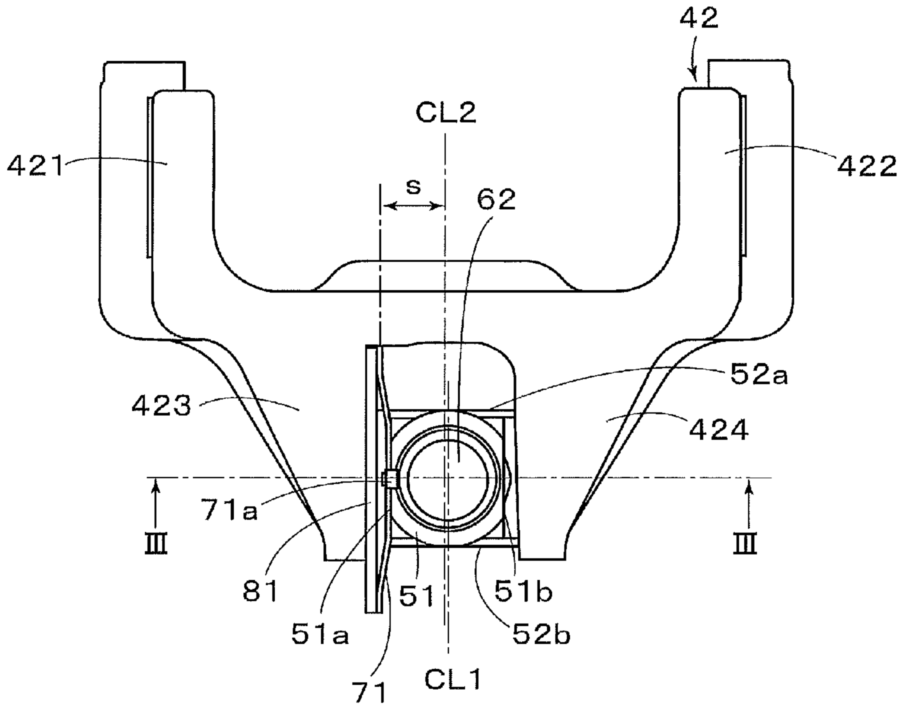
F I G. 3
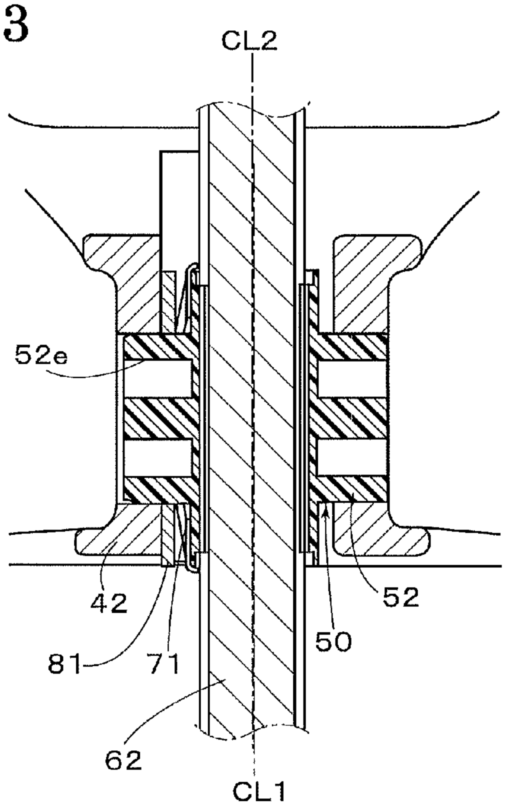

F I G. 10
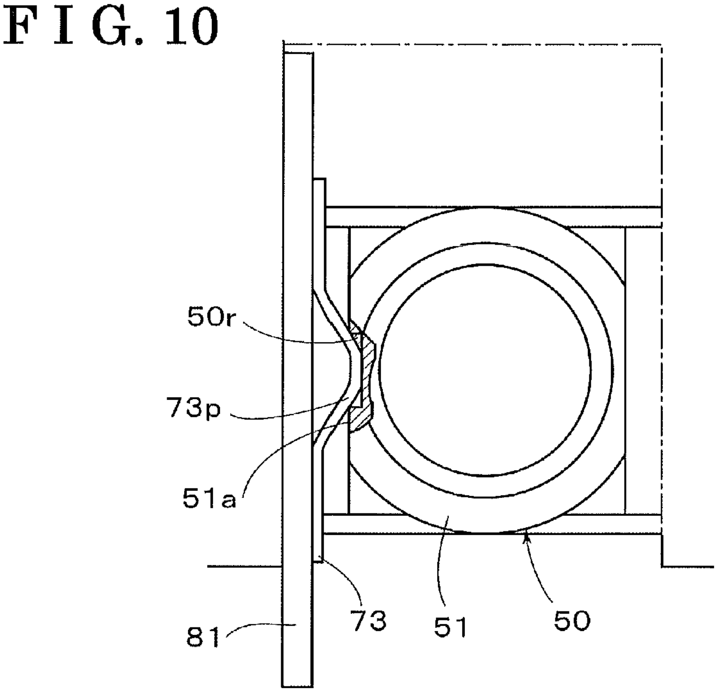
F I G. 11
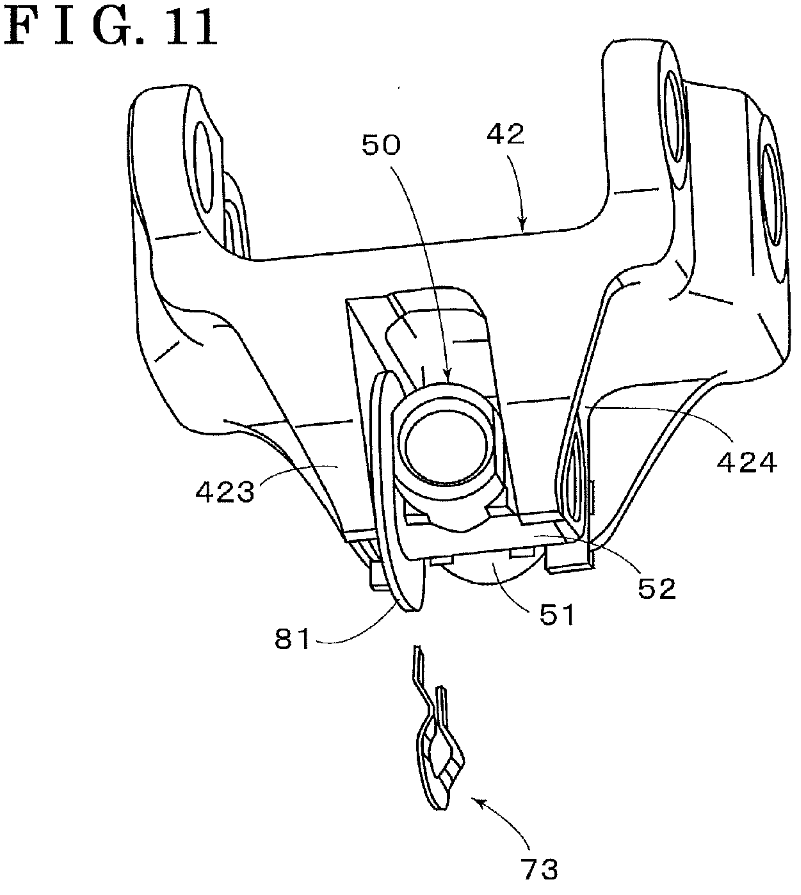

F I G. 14
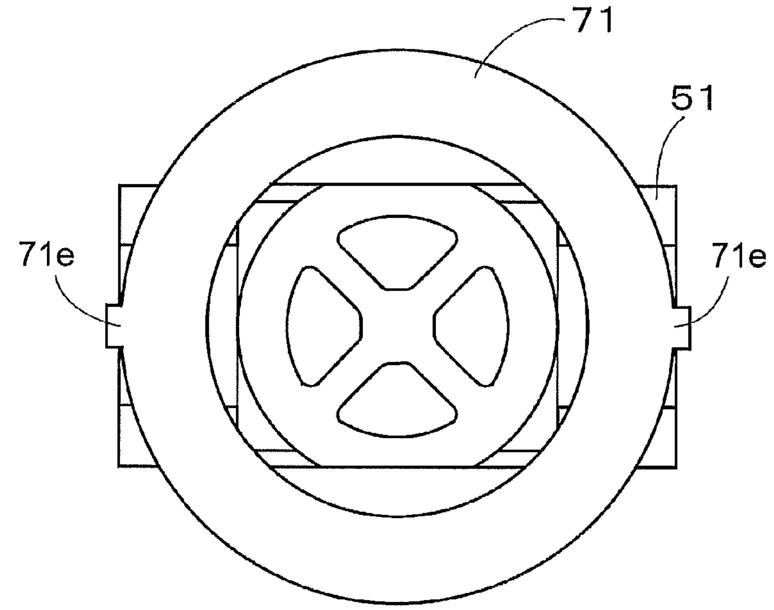
F I G. 15
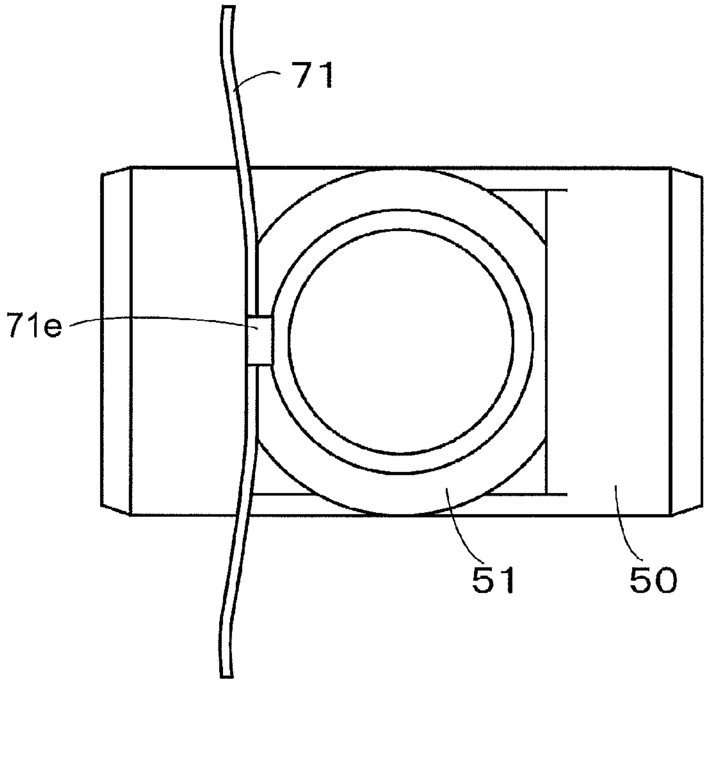

STEERING APPARATUS FOR VEHICLE

CROSS REFERENCE TO RELATED APPLICATIONS

This application is based on and claims priority under 35 U.S.C. §119 to Japanese Patent Application 2011-208393, filed on Sep. 26, 2011, the entire content of which is incorporated herein by reference.

TECHNICAL FIELD

This disclosure generally relates to a steering apparatus for a vehicle.

BACKGROUND DISCUSSION

A known steering apparatus includes mechanisms allowing an operation position of a steering wheel to be adjusted, which includes a telescopic mechanism allowing the operation position in a vehicle front-rear direction to be adjusted and a tilt mechanism allowing the operation position in a vehicle up-down direction to be adjusted. Specifically, related to the tilt mechanism, it is important that shakiness or looseness between a threaded shaft and a nut member is restricted, and a smooth slidability is ensured. For example, a slider mechanism constituted by a shaft (a threaded shaft) and a slider (a nut member) is disclosed in JP2000-280916A (hereinafter referred to as Patent reference 1). According to the slider mechanism suggested in Patent reference 1, the slider mechanism includes the shaft provided with a male threaded portion operably connected to an output shaft of a drive source and rotating therewith, and a female threaded portion formed in a substantially cylindrical shape. The female threaded portion is arranged around the male threaded portion so as to engage therewith, and moves with a target to be driven, while the female threaded portion is restricted from rotating in a rotational direction of the shaft. The slider mechanism disclosed in Patent reference 1 also includes a biasing member biasing the female threaded portion in a radial direction, and a pressing member which includes a contacting portion which is in contact with the male threaded portion and which receives a counter force of the biasing force of the biasing member so that the counter force acts as a contact force between the male threaded portion and the contacting portion. According to the slider mechanism suggested in Patent reference 1, the female threaded portion formed in the substantially cylindrical shape is biased in the radial direction by the biasing force of the biasing member and is securely in contact with the male threaded portion of the shaft. The counter force of the biasing force is received by the pressing member and the contacting portion of the pressing member is securely in contact with the male threaded portion of the shaft, and thus a backlash at an engaging portion of the threaded portions is forcibly removed. In addition, according to the slider mechanism suggested in Patent reference 1, deformation that occurs to a nut made of resin is not used as a measure to remove the backlash. Therefore, fluctuation in a sliding-friction torque at a screw mechanism portion, which is caused by changes in a Young's modulus of the nut and which is found in conventional techniques, does not occur. Further, it is suggested in the Patent reference 1 that, even in a case where resin material is used for the nut and metal material is used for the shaft, a tendency of tight fit at low temperatures is not likely to occur because the deformation of the nut is not utilized for removing the backlash unlike the conventional techniques.

A known electrically-powered steering column apparatus is disclosed in JP2009-248703A (hereinafter referred to as Patent reference 2). According to the electrically-powered steering column apparatus disclosed in Patent reference 2, a steering column rotatably supporting a steering shaft is driven so that a position of the steering column is adjustable in a tilt direction or in a telescopic direction. The electrically-powered steering column apparatus includes a motor, a rotating member driven by the motor to rotate and an axial-direction-displacing object for driving the steering column to move in the tilt direction or in the telescopic direction as the axial-direction-displacing object displaces itself, that is, moves, in the axial direction in response to rotation of the rotating member, wherein a coefficient of thermal expansion of the rotating member and a coefficient of thermal expansion of the axial-direction-displacing object are substantially equal to each other, a resin material is connected to a peripheral surface of one of the rotating member and the axial-direction-displacing object, and the resin material includes a threaded portion that is threadedly engaged with a threaded portion formed on a peripheral surface of the other one (which is made of metal) of the rotating member and the axial-direction-displacing object, which is made of metal. According to the apparatus disclosed in Patent reference 2, because the coefficient of thermal expansion of the rotating member and the coefficient of thermal expansion of the axial-direction-displacing object are substantially equal to each other, even in a case where an environmental temperature inside a vehicle cabin at which the electrically-powered steering column apparatus is arranged, amount of expansion or shrinkage is maintained substantially equal between the rotating member and the axial-direction-displacing object. Accordingly, for example, shakiness or looseness, and/or tight fitting are restricted from occurring.

According to the tilt mechanism disclosed in Patent reference 1, for example, the biasing member (spring) and the pressing member are needed, which increases the number of parts and assembly workload. Further, according to a first embodiment disclosed in Patent reference 1, a horizontal hole that is orthogonal to the shaft (threaded shaft) is provided at the resin-made female threaded member (nut member). Therefore, a degree of difficulty in resin-molding of the female threaded member increases, resulting in a cost increase. On the other hand, according to the electrically-powered steering column apparatus disclosed in Patent reference 2, dimensions of the threaded portions include variation within a certain range due to manufacturing variation of the rotating member (threaded shaft) and the axial-direction-displacing object (nut member). Because the initial variation is not absorbed, the looseness and tight-fitting that are attributed to the initial variation are not restricted. In addition, because one of the rotating member and the axial-direction-displacing object is made of resin and the other one is made of metal, a difference in coefficient of linear expansions arises between the rotating member and the axial-direction-displacing object that are threadedly engaged with each other (the difference in the coefficient of linear expansions does not decrease to zero), and thus it is concerned that the looseness and/or tight-fitting may be caused by temperature changes.

A need thus exists for a steering apparatus for a vehicle, which is not susceptible to the drawback mentioned above.

SUMMARY

According to the embodiments, a steering apparatus for a vehicle provided with a steering wheel, the steering apparatus includes a main housing including a first end portion and a second end portion, and supported in a manner that the main housing is pivotable relative to a vehicle body about a pivoting center at the first end portion, a movable column member accommodated and supported in the main housing in a movable manner in a front-rear direction of the vehicle body, a fixing bracket fixing the second end portion of the main housing to the vehicle body in a state where the fixing bracket supports the second end portion of the main housing in a manner that the second end portion is movable in an up-down direction of the vehicle body relative to the vehicle body, a link mechanism including a first end portion and a second end portion, the first end portion of the link mechanism being supported by the fixing bracket, and a drive mechanism connected to the second end portion of the link mechanism, wherein the drive mechanism includes a motor, a threaded shaft pivotably supported by the second end portion of the main housing and rotated by driving of the motor, and a nut member moving in an axial direction of the threaded shaft in response to rotation of the threaded shaft, the nut member is threadedly engaged with the threaded shaft, the nut member includes a female threaded portion including two flat surface portions which are positioned facing each other and are parallel to the threaded shaft, one of the two flat surface portions is away from a central axis of the female threaded portion of the nut member by a first predetermined distance and the other one of the two flat surface portions is away from the central axis by a second predetermined distance, the nut member includes a pivot shaft portion including a rotational axis that is orthogonal to an axis of the female threaded portion, the link mechanism includes at least one bearing portion provided at the second end portion of the link mechanism and rotatably supporting the pivot shaft portion, and the link mechanism includes a spring member arranged between the bearing portion and at least one of the two flat surface portions of the female threaded portion, and pressing the female threaded portion in a direction which is orthogonal to the axial direction of the threaded shaft.

BRIEF DESCRIPTION OF THE DRAWINGS

The foregoing and additional features and characteristics of this disclosure will become more apparent from the following detailed description considered with the reference to the accompanying drawings, wherein:

FIG. 2 is a front view illustrating a state where a nut member is supported at a link member according to the first embodiment;

FIG. 3 is a cross-sectional view taken along line III-III in FIG. 2;

FIG. 10 is an enlarged front view illustrating the state where the nut member is supported at the link member illustrated in FIG. 9;

FIG. 11 is a perspective view illustrating the link member and the nut member according to the fourth embodiment;

FIG. 14 is a side view illustrating a state where a third modification of the curved washer and a first modification of the nut member, which are according to the first embodiment, are assembled;

FIG. 15 is a front view illustrating a state where the third modification of the curved washer and the first modification of the nut member, which are according to the first embodiment, are assembled;

DETAILED DESCRIPTION

Figure 1:
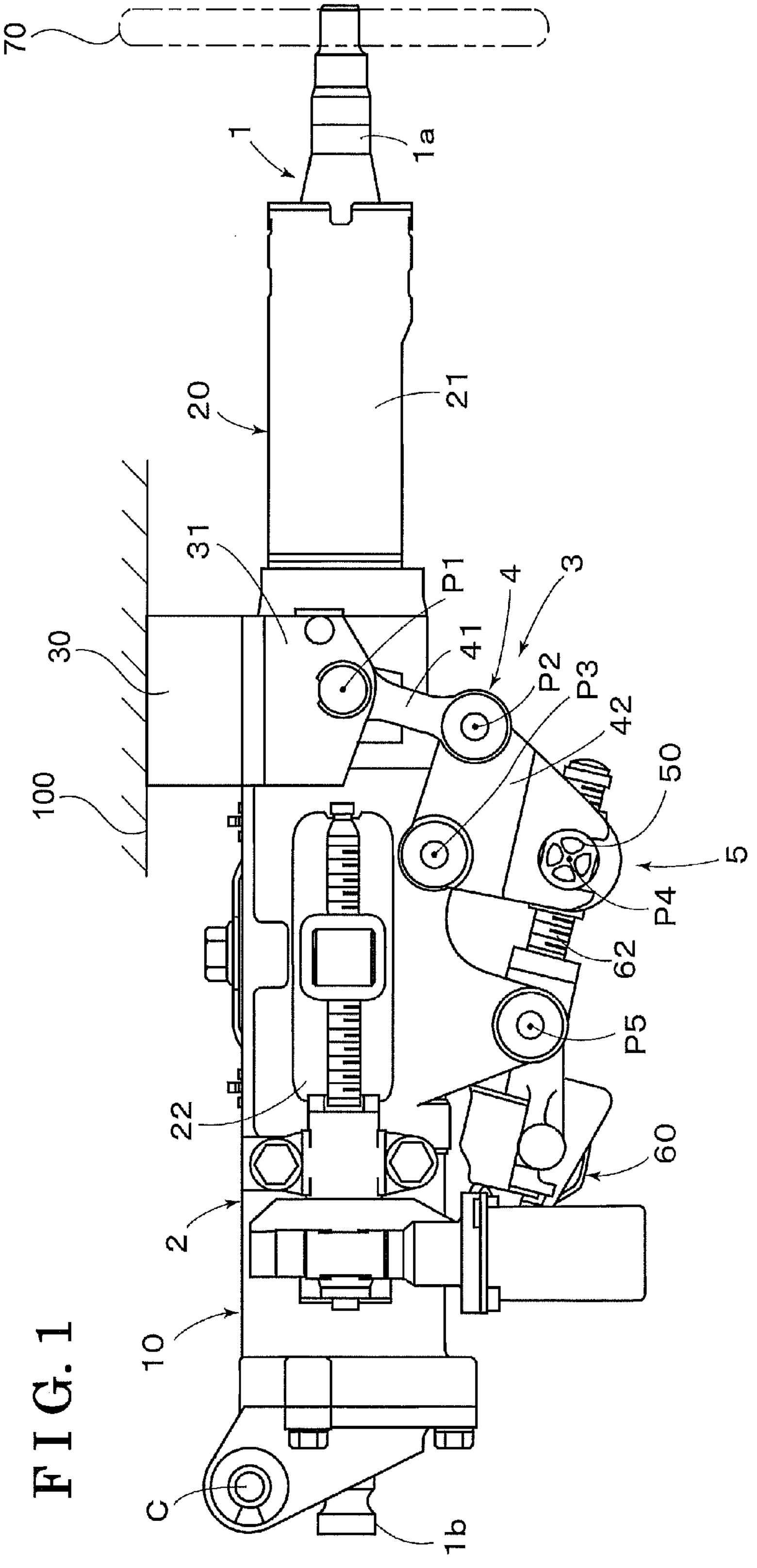
FIG. 1 is a side view illustrating a steering apparatus according to a first embodiment disclosed here.

A first embodiment of this disclosure will be explained hereunder with reference to the drawings. As illustrated in FIG. 1, according to a steering apparatus for a vehicle of the embodiment, a steering shaft 1 includes an upper shaft 1*a* formed in a tubular form and a lower shaft 1*b* that is spline-fitted to a front end portion of the upper shaft 1*a*. A steering wheel 70 is connected to a rear end portion of the upper shaft 1*a*. In other words, the upper shaft 1*a* and the lower shaft 1*b* are connected such that the upper shaft 1*a* and the lower shaft 1*b* may move relative to each other in an axial direction thereof. A front end portion of the lower shaft 1*b* is connected to a steering mechanism. The steering mechanism is driven to steer vehicle wheels via a wheel steering mechanism in response to an operation of the steering wheel 70.

A main housing 10 including a first end portion and a second end portion is arranged coaxially with the steering shaft 1, and is supported in a manner that the main housing 10 is pivotable about a pivoting center C at the first end portion relative to a vehicle body 100. At the same time, the main housing 10 is retained by a fixing bracket 30. The fixing bracket 30 includes a pair of retaining portions 31 facing each other and extending in a downward direction of the vehicle. In FIG. 1, one of the pair of retaining portions 31 is illustrated. The main housing 10 is retained between the pair of retaining portions 31 so that the main housing 10 is fixed to the vehicle body 100 as illustrated in an upper portion of FIG. 1. Further, a thrust structure is placed between each of the retaining portions 31 of the fixing bracket 30 and the main housing 10. With the thrust applied by the thrust mechanism, the main housing 10 is slidably supported to the fixing bracket 30.

Within the main housing 10, a movable column member 20 is retained such that the movable column member 20 is movable in an axial direction thereof, that is, in a front-rear direction of the vehicle body 100. The movable column member 20 includes an inner tube 21 made of metal and an outer tube 22 made of metal. The inner tube 21 accommodates and retains the steering shaft 1 such that the steering shaft 1 is rotatable about the axis. The outer tube 22 accommodates the inner tube 21. In an ordinary situation, the outer tube 22 retains the inner tube 21 at a predetermined position. The inner tube 21 is referred to also as an upper tube. The outer tube 22 is referred to also as a telescopic tube. The upper shaft 1*a* is rotatably supported at a rear end portion of the inner tube 21 via a bearing. A relative movement in the axial direction between the upper shaft 1*a* and the inner tube 21 is restricted. Accordingly, the upper shaft 1*a* and the inner tube 21 are configured to be movable integrally with each other in the axial direction.

Thus, a telescopic mechanism 2 is configured such that the outer tube 22, the inner tube 21, the steering shaft 1, and the steering wheel 70 are movable integrally with one another in the axial direction relative to the main housing 10, so that the steering wheel 70 is adjusted to an intended position in the front-rear direction of the vehicle body 100. The telescopic mechanism 2 is configured to allow a relative movement of the inner tube 21 (accordingly a relative movement of the upper shaft 1*a*) in the axial direction relative to the outer tube 22 in a case where the steering shaft 1 is applied with a load equal to or greater than a predetermined value. In other words, the inner tube 21 and the outer tube 22 function as an energy absorbing means together with, for example, an annular frictional member (for example, a resilient bush made of metal), which is placed between the inner tube 21 and the outer tube 22.

On the other hand, a first end portion of a link mechanism 4 is supported by the fixing bracket 30 and a second end portion of the link mechanism 4 is connected to a drive mechanism 5, so that the drive mechanism 5 is pivotably supported at the movable column member 20. Thus, a tilt mechanism 3 is configured in a manner that the drive mechanism 5 allows, via the link mechanism 4, the movable column member 20 to pivot relative to the vehicle body 100. Accordingly, the steering wheel 70 is adjusted to an intended position in an up-down direction of the vehicle body 100. As illustrated in FIG. 1, according to the link mechanism 4 of the embodiment, an upper end portion of a first link (constituted by a pair of link members 41) is supported at a lower portion of the fixing bracket 30 to be rotatable about a pivot axis P1, and a lower end portion of the first link is supported at upper rear end portions of a pair of arm portions 421, 422 (refer to FIG. 2) of a second link (constituted by a link member 42) to be rotatable about a pivot axis P2. As used herein, the terms "front", "rear", "upper", "lower" and derivatives thereof related to the steering apparatus are based on front-rear and up-down directions of the vehicle in a state where the steering apparatus is mounted on the vehicle.

Figure 4:
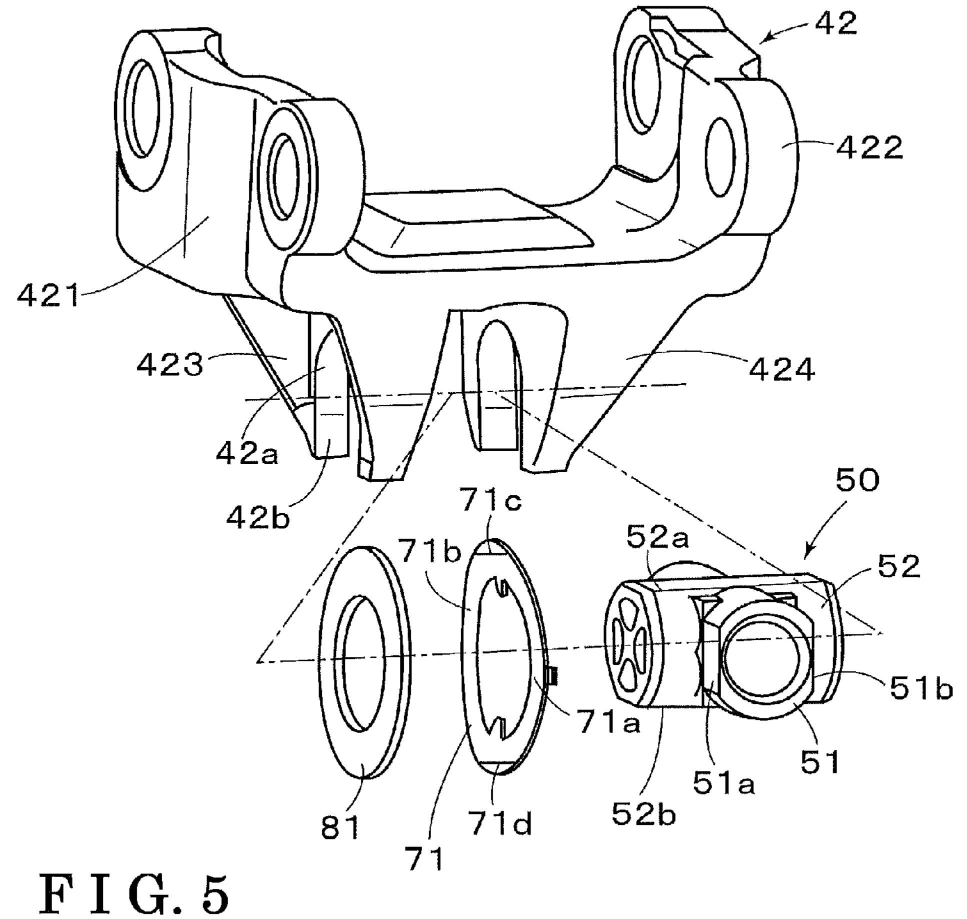
FIG. 4 is an exploded perspective view illustrating the link member and the nut member of the first embodiment.

The link member 42 constituting the second link is formed in a shape of a bell crank as illustrated in FIGS. 2 and 4 in enlarged scales. The link member 42 is supported at a lower portion of the main housing 10 to be pivotable about a pivot axis P3 in a manner that the main housing 10 is held between upper front end portions of the pair of arm portions 421, 422, and the link member 42 is supported to be pivotable about a pivot axis P4 in a manner that a nut member 50 is held between a pair of leg portions 423, 424 of the second link (the link member 42). The nut member 50 is also referred to as a tilt nut or a tilt slider, and constitutes, together with, for example, a threaded shaft 62, the drive mechanism 5 serving as a drive source of the tilt mechanism 3. The link members 41, 42, the drive mechanism 5, the movable column member 20 and the main housing 10 are connected to one another by press-fitting pivot pins or by screwing pivot screws. Each of the pivot axis P1 and the pivot axis P5 is constituted by the pivot pin, each of the pivot axis P2 and the pivot axis P3 is constituted by the pivot screw, and the pivot axis P4 is constituted by the nut member 50. The threaded shaft 62 is pivotably supported by the second end portion of the main housing 10.

Thus, the steering apparatus of the embodiment is configured such that in a case where the nut member 50 moves in an axial direction of the threaded shaft 62 as the threaded shaft 62 is driven to rotate by an electric motor 60 serving as a motor, the second link (the link member 42) pivots about the pivot axis P3 and the first link (the link member 41) pivots about the pivot axis P1, so that the main housing 10 (together with the outer tube 22, the inner tube 21, the upper shaft 1*a* and the steering wheel 70) moves in the up-down direction of the vehicle body 100 relative to the vehicle body 100. In the embodiment, a speed reduction mechanism is arranged between an output shaft of the electric motor 60 and the threaded shaft 62, and thus the output, that is, the number of rotations, of the electric motor 60 is appropriately decelerated before being transmitted to the threaded shaft 62. According to the embodiment, the electric motor 60 is arranged at a forward portion of the vehicle body 100 relative to the pivot shaft portion 52. Consequently, it is restricted that the electric motor 60 is in contact with knees of an occupant of the vehicle.

As illustrated in FIG. 4, the nut member 50 of the embodiment includes a female threaded portion 51 threadedly engaged with the threaded shaft 62 constituted to include trapezoidal screw thread, and a pivot shaft portion 52 functioning as the pivot axis P4. The female threaded portion 51 is threadedly engaged with the threaded shaft 62 at an inner peripheral surface of the female threaded portion 51. The nut member 50 is made of resin and is formed in a cross shape in a plan view. The female threaded portion 51 includes two flat surface portions 51*a*, 51*b* which are positioned facing each other and are parallel to the threaded shaft 62. The two flat surface portions 51*a*, 51*b* are provided at an outer peripheral surface of the female threaded portion 51. One of the two flat surface portions 51*a*, 51*b* is away from a central axis CL1 (refer to FIGS. 2 and 3) of the female threaded portion 51 of the nut member 50 by a first predetermined distance and the other one of the two flat surface portions 51*a*, 51*b* is away from the central axis CL1 by a second predetermined distance. In addition, the pivot shaft portion 52 includes a rotational axis (serving as the pivot axis P4) which is orthogonal to the axis, that is, the central axis CL1, of the female threaded portion 51. The pivot shaft portion 52 includes two flat surface portions 52*a*, 52*b* which are formed to be parallel to the rotational axis and which face each other and away from each other by a predetermined distance. On the other hand, each of the leg portions 423, 424 of the link member 42 constituting the second link serves as a bearing portion rotatably supporting the pivot shaft portion 52. Each of the leg portions 423, 424 is formed with a bearing hole 42*a* and a cut-out portion 42*b*. The cut-out portion 42*b* opens from the bearing hole 42*a* in a direction orthogonal to the rotational axis, that is, the cut-out portion 42*b* is formed continuously from the bearing hole 42*a*. Each cut-out portion 42*b* includes two flat surfaces, and the two flat surfaces are configured to be parallel to the two flat surface portions 52*a*, 52*b*. Axial end portions of the pivot shaft portion 52 of the nut member 50 are supported at the pair of bearing portions 423, 424, respectively.

An opening width of the cut-out portion 42*b* is set to be smaller than an inner diameter of the bearing hole 42*a* and to be slightly greater than a dimension (that is, a width-acrossflats) between the two flat surface portions 52*a*, 52*b* of the pivot shaft portion 52. This allows the two flat surface portions 52*a*, 52*b* of the pivot shaft portion 52 to be inserted in the bearing hole 42*a* via the cut-out portion 42*b*. The inner diameter of the bearing hole 42*a* is set to be slightly greater than an outer diameter of the pivot shaft portion 52 so that the pivot shaft portion 52 fits in the bearing hole 42*a*.

On the other hand, in order to restrict shakiness or looseness that is attributed to screwing or engaging between the female threaded portion 51 of the nut member 50 and the threaded shaft 62, a curved washer 71 and a shim 81 are arranged between an inner side flat surface portion of the leg portion 423 or of the leg portion 424 of the link member 42 and the flat surface portion 51*a* of the female threaded portion 51 so that the female threaded portion 51 is pressed in a direction that is orthogonal to the threaded shaft 62 by a biasing force of the curved washer 71. The leg portions 423, 424 of the link member 42 serve as the bearing portions relative to the female threaded portion 51 of the nut member 50.

The curved washer 71 is a spring member which includes an annular cross-section, and is fitted around and retained at the pivot shaft portion 52. The curved washer 71 generates a resilient repulsive force when being compressed. Contacting portions 71*a*, 71*b* are provided at two positions at an outer circumferential portion of the curved washer 71 and are in contact with the flat surface portion 51*a* of the female threaded portion 51. Contacting portions 71*c*, 71*d* are positioned in a manner that a line connecting the contacting portions 71*c* and 71*d* in a radial direction of the curved washer 71 and a line connecting the contacting portions 71*a* and 71*b* in the radial direction of the curved washer 71 are substantially orthogonal to each other, and each of the contacting portions 71*c*, 71*d* is in contact with the shim 81 at a surface at an opposite side to a surface that is in contact with the flat surface portions 51*a*. A contact surface of each of the contacting portions 71*a*, 71*b*, 71*c*, 71*d* contacting with the female threaded portion 51 and/or with the shim 81 may be a flat surface or a curved surface. In a state where the curved washer 71 and the shim 81 are assembled as illustrated in FIGS. 2 and 3, a distance (that is, a dimension s in FIG. 2) between a contact surface of the shim 81 and a central axis CL2 of the threaded shaft 62 is set so that the resilient repulsive force generated by the curved washer 71 is an appropriate load, and thickness of the shim 81 is set in accordance with the dimension s. In this case, when the aforementioned load due to the resilient repulsive force is too small, the shakiness or looseness of the nut member 50 is not completely removed, and therefore a driver of the vehicle on which the steering apparatus is mounted may have a feeling of shakiness or vibration at the steering wheel 70 with a sense of discomfort. On the other hand, when the aforementioned load is too large, a burden applied to the threaded shaft 62 increases, thereby resulting in premature wear and/or abnormal noises generated during sliding movements. In light of this, the thickness of the shim 81 is set in such a way that the appropriate load is obtained.

According to the aforementioned arrangement of the curved washer 71 and the shim 81 of the embodiment, by assembling the curved washer 71 and the shim 81 on the link member 42 in a state where the nut member 50 is threadedly engaged with the threaded shaft 62, the curved washer 71 is compressed and thus the resilient repulsive force of the curved washer 71 causes the female threaded portion 51 of the nut member 50 to move in the right-hand direction in FIGS. 2 and 3 until the trapezoidal screw thread of the female threaded portion 51 of the nut member 50 comes in contact with the trapezoidal screw thread of the threaded shaft 62, and thus the shakiness or looseness of the threaded shaft 62 is removed. In other words, as illustrated in FIGS. 2 and 3, the female threaded portion 51 is dislocated by a distance between the central axis CL2 of the threaded shaft 62 and the central axis CL1 of the nut member 50 (the female threaded portion 51), the distance which corresponds to the looseness between the trapezoidal screw thread of the female threaded portion 51 and the trapezoidal screw thread of the threaded shaft 62. In other words, the central axis CL1 of the female threaded portion 51 and the central axis CL2 of the threaded shaft 62 are positioned offset from each other. Changes in the repulsive force, which are caused by the manufacturing variation of each part and component, and by the wear of the threaded portions due to a tilt operation, are reduced by setting a spring constant of the curved washer 71 at minimum, and therefore the nut member 50 is biased by a stable resilient repulsive force. In order to minimize material and mass of the nut member 50, plural recessed portions 52*e* are provided at the pivot shaft portion 52 as illustrated in FIG. 3. In FIG. 3, one of the plural recessed portions 52*e* is illustrated.

Figure 5:
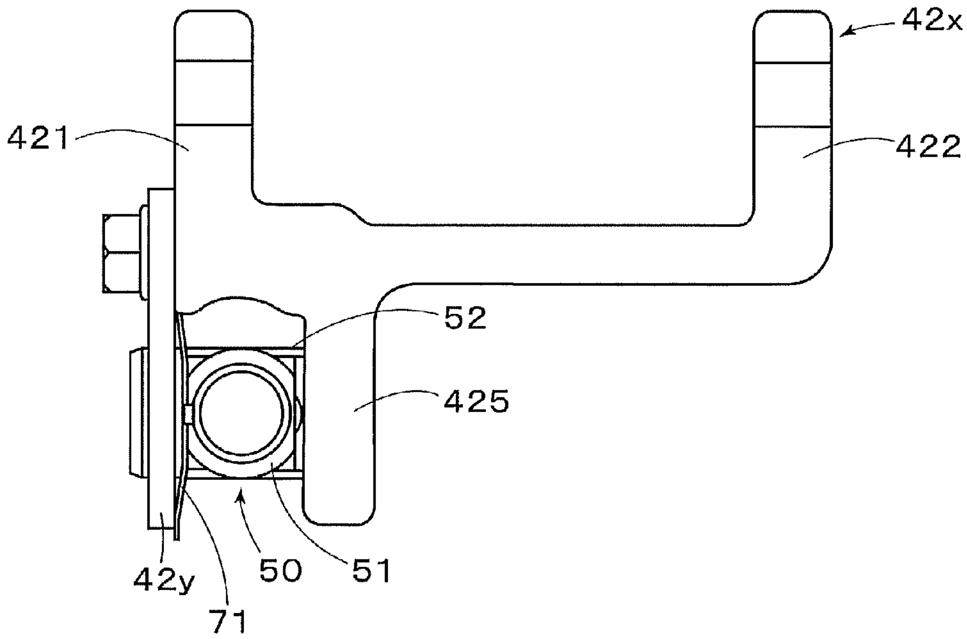
FIG. 5 is a front view illustrating a state where a nut member is supported at a link member according to a second embodiment disclosed here.
Figure 6:
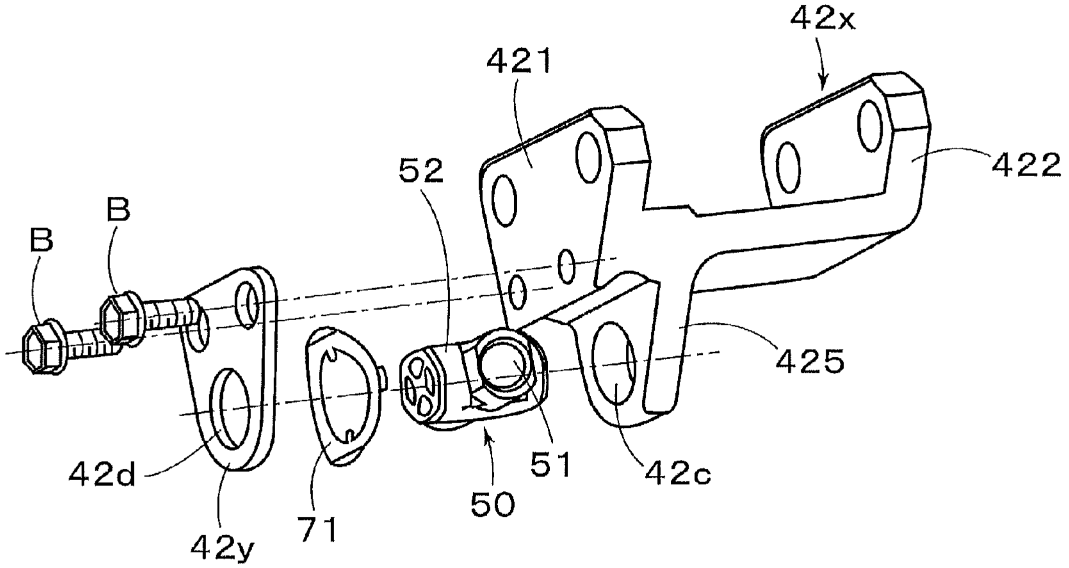
FIG. 6 is an exploded perspective view illustrating the link member and the nut member according to the second embodiment.

In a second embodiment disclosed here, a supporting structure supporting the pivot shaft portion 52 of the nut member 50 is modified as illustrated in FIGS. 5 and 6. In the embodiment, a link member 42*x* includes a leg portion 425 and a plate 42*y* arranged parallel to the leg portion 425 while a predetermined distance is provided between the plate 42*y* and the leg portion 425, and fastened with a bolt B, for example, at two positions. Each of the leg portion 425 and the plate 42*y* includes the bearing portion 425. One axial end portion of the pivot shaft portion 52 is fitted by insertion in a bearing hole 42*c* of the leg portion 425 of the link member 42*x*, and the other axial end portion of the pivot shaft portion 52 is fitted by insertion in a bearing hole 42*d* of the plate 42*y*, and thus the pivot shaft portion 52 is supported. In the embodiment, the shim 81 may be eliminated in a case where the contacting portions 71*c*, 71*d* of the curved washer 71 are set to be in contact with an inner side flat surface portion of the plate 42*y*. Other structures of the second embodiment are identical to those of the first embodiment, and explanations will not be repeated.

Figure 7:
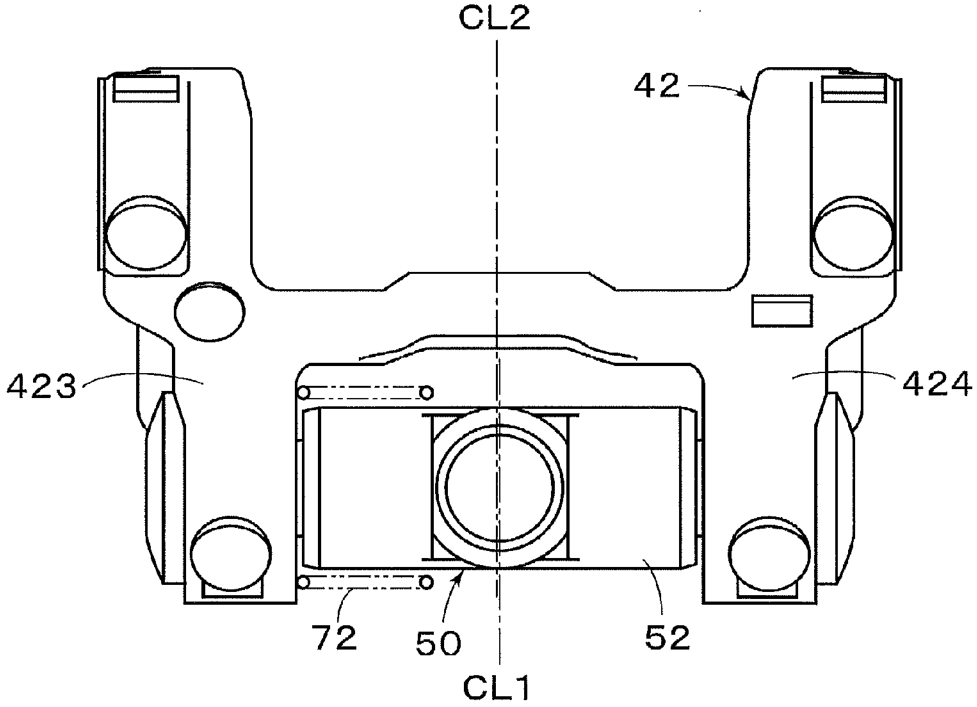
FIG. 7 is a front view illustrating a state where a nut member is supported at a link member according to a third embodiment disclosed here.
Figure 8:
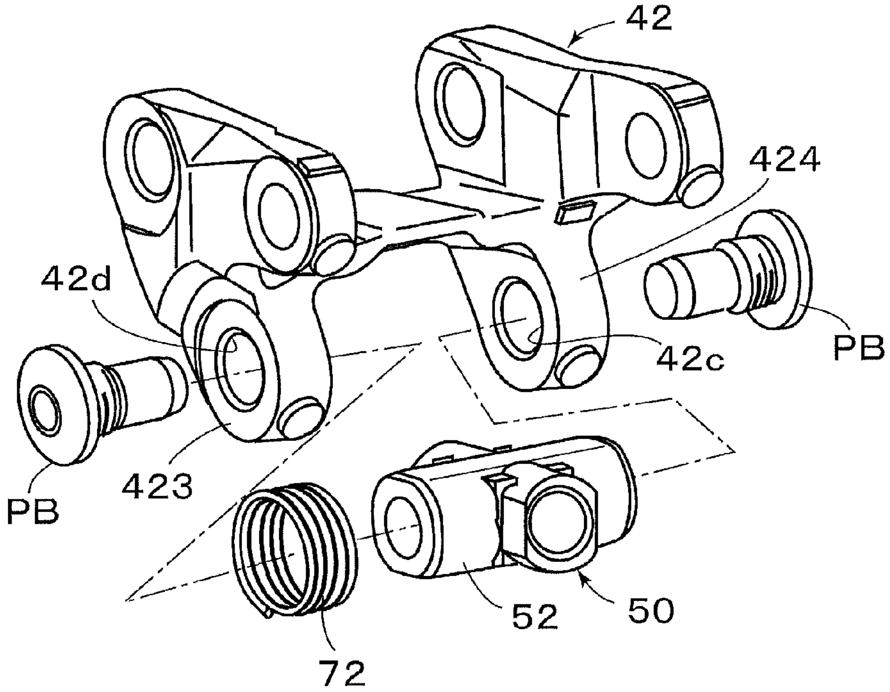
FIG. 8 is an exploded perspective view illustrating the link member and the nut member according to the third embodiment.

In a third embodiment disclosed here, a coil spring 72 is used as the spring member instead of the curved washer 71 as illustrated in FIGS. 7 and 8. The leg portions 423, 424 of the link member 42 include the bearing holes 42*d*, 42*c*, respectively, and the coil spring 72 is wound around one side of the pivot shaft portion 52. In a state where the coil spring 72 is wound around the one side of the pivot shaft portion 52, the pivot shaft portion 52 is rotatably supported by pivot screws PB, PB at the bearing holes 42*c*, 42*d*. Other structures of the third embodiment are identical to those of the first embodiment, and explanations will not be repeated.

Figure 9:
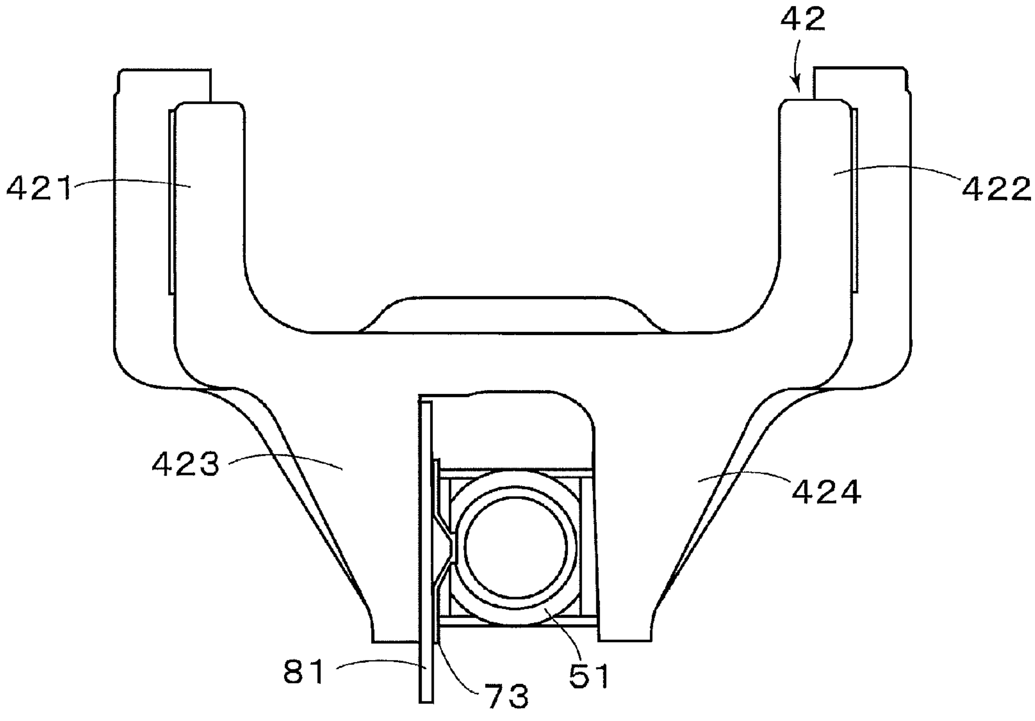
FIG. 9 is a front view illustrating a state where a nut member is supported at a link member according to a fourth embodiment disclosed here.

In a fourth embodiment disclosed here, a curved washer 73 including a cross-section having a U-shape is used as the spring member instead of the curved washer 71 including the annular cross-section as illustrated in FIGS. 9 to 11. FIG. 9 illustrates a state where the curved washer 73 is attached. The curved washer 73 is held at the pivot shaft portion 52 and retained thereat in a manner that pivot shaft portion 52 is placed to fit within the U-shape. In order to prevent the curved washer 73 from disengaging and coming off due to, for example, its own weight and/or vibrations in a state where the curved washer 73 is attached, a central portion of the curved washer 73 is bent to form a protruding portion 73*p* as illustrated in FIG. 10 in an enlarged scale. The nut member 50 includes a recessed portion 50*r* provided at the flat surface portion 51*a* of the female threaded portion 51 and engaging with the protruding portion 73*p*. In the embodiment, as illustrated in FIG. 11, the curved washer 73 may be inserted, that is, fitted around the pivot shaft portion 52 from an opening portion of the U-shape of the curved washer 73. Thus, the curved washer 73 may be assembled by fitting as described above after the nut member 50 and the shim 81 are assembled on the link member 42. Other structures of the fourth embodiment are identical to those of the first embodiment, and explanations will not be repeated.

The shape of the curved washer 71 and the dimension s in FIG. 2 are set so that an appropriate elastic load is generated in a state where the contacting portions 71*a*, 71*b* are in contact with the flat surface portion 51*a* of the nut member 50 and the contacting portions 71*c*, 71*d* are in contact with the shim 81. Accordingly, in a case where the curved washer 71 rotates about the pivot shaft portion 52 as the nut member 50 rotates relative to the link member 42 during the tilt operation, the contacting portions 71*a*, 71*b* may disengage from and come off the flat surface portion 51*a* of the nut member 50, and as a result, an amount of compression of the curved washer 71 may change, and thus the elastic load may change. Mechanical methods of restricting the curved washer 71 from rotating are illustrated in FIGS. 12 to 17.

Figure 12:
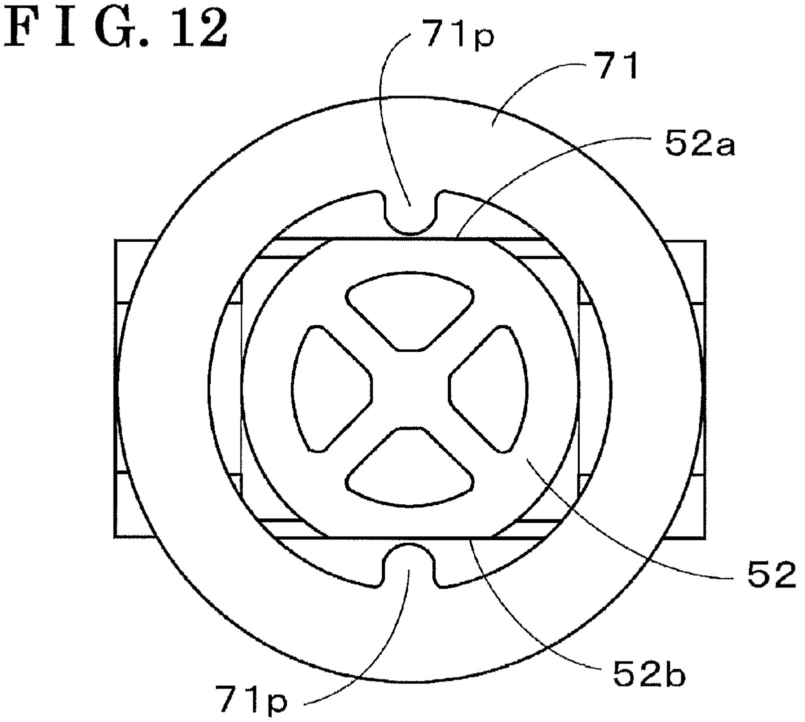
FIG. 12 is a side view illustrating a state where a first modification of a curved washer, and the nut member, which are according to the first embodiment, are assembled.
Figure 13:
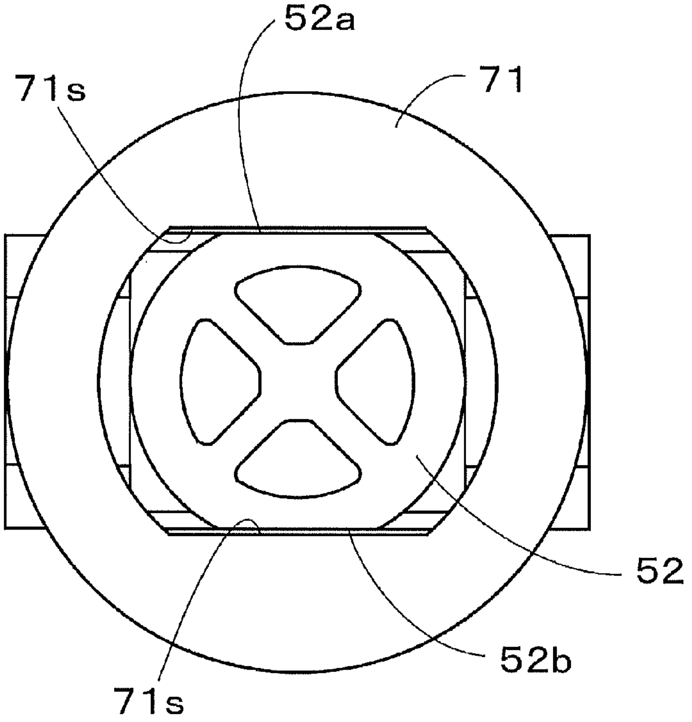
FIG. 13 is a side view illustrating a state where a second modification of the curved washer, and the nut member, which are according to the first embodiment, are assembled.

As illustrated in FIG. 12, a protrusion 71*p*, for example, a pair of protrusions 71*p*, serving as a contacting portion is provided at a radially inner side of the curved washer 71 including the annular cross-section. The protrusions 71*p* are arranged to be in contact with the flat surface portions 52*a*, 52*b* of the pivot shaft portion 52 of the nut member 50. As illustrated in FIG. 13, a flat surface portion 71*s*, for example, a pair of flat surface portions 71*s*, is provided at an inner peripheral side of the curved washer 71 including the annular cross-section. The flat surface portion 71 serving as the contacting portion is in contact with the flat surface portions 52*a*, 52*b* of the pivot shaft portion 52. Thus, a width-across-flats is configured at the curved washer 71 in a similar manner to that of the nut member 50, and therefore the rotation of the curved washer 71 is securely restricted.

Figure 16:
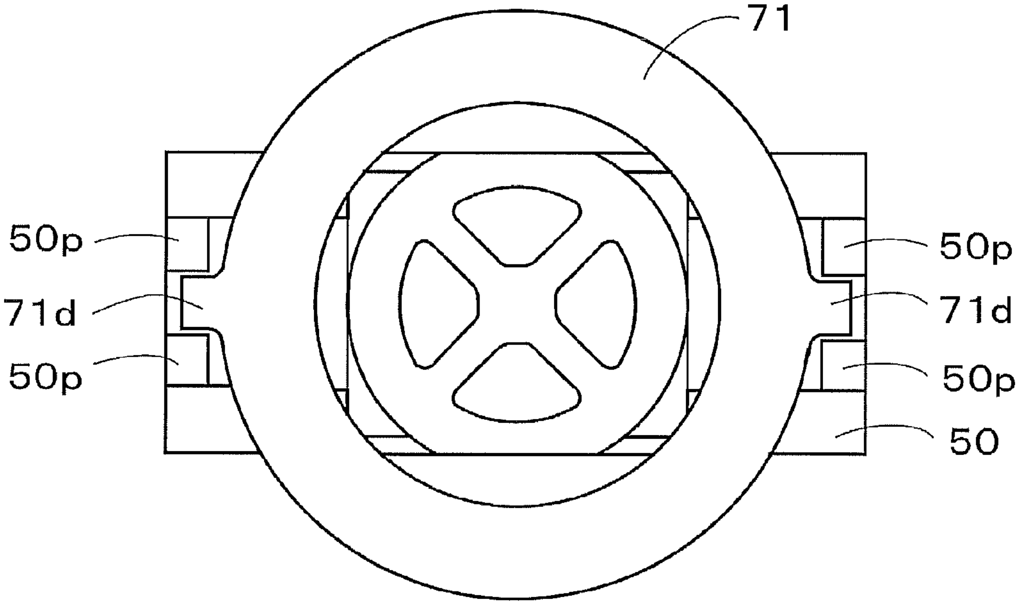
FIG. 16 is a side view illustrating a state where a fourth modification of the curved washer and a second modification of the nut member, which are according to the first embodiment, are assembled.
Figure 17:
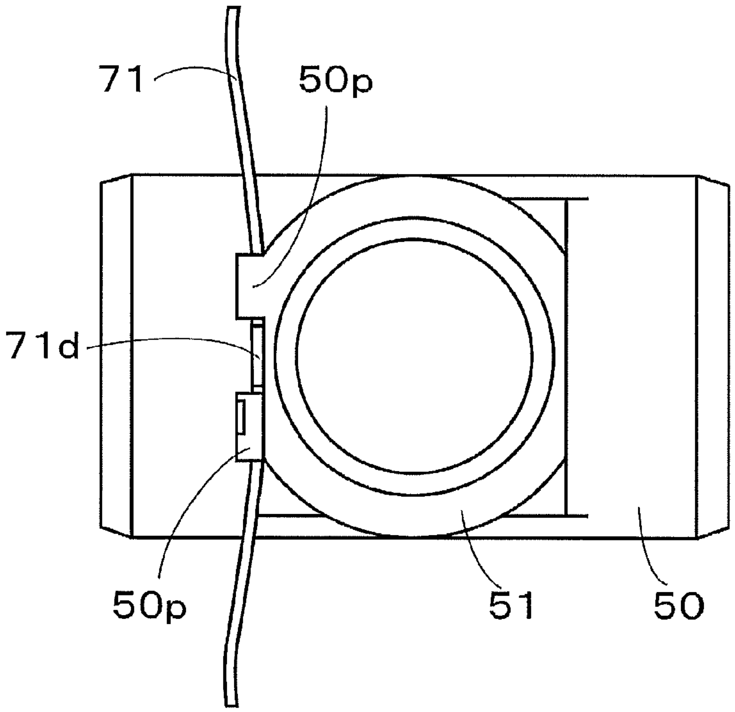
FIG. 17 is a front view illustrating a state where the fourth modification of the curved washer and the second modification of the nut member, which are according to the first embodiment, are assembled.

As illustrated in FIGS. 14 and 15, a pair of bent portions 71*e* is provided at an outer peripheral side of the curved washer 71 including the annular cross-section. Once the curved washer 71 is attached to the nut member 50, the curved washer 71 is kept at the nut member 50 in a state where inner side surfaces of the bent portions 71*e* are respectively in contact with end surfaces of the female threaded portion 51 of the nut member 50. Thus, the rotation of the curved washer 71 is securely restricted. As illustrated in FIGS. 16 and 17, a pair of protrusions 71*d* is provided at the outer peripheral side of the curved washer 71 including the annular cross-section. A pair of protrusions 50*p* is provided at the flat surface portion 51*a* of the female threaded portion 51 on both sides relative to the pivot shaft portion 52 in the axial direction of the female threaded portion 51 (that is, a total of four protrusions 50*p* are provided) to protrude from the flat surface portion 51*a* outwardly in a radial direction of the female threaded portion 51 so that the protrusions 50*p* retain the protrusions 71*d* in a manner that each protrusion 71*d* is sandwiched between the corresponding pair of protrusions 50*p*. Thus, once the curved washer 71 is attached to the nut member 50, each protrusion 71*d* is held between the corresponding pair of protrusions 50*p* so as to fit therebetween. Thus, the rotation of the curved washer 71 is securely restricted.

According to the embodiments, the steering apparatus for a vehicle provided with the steering wheel 70, the steering apparatus includes the main housing 10 including the first end portion and the second end portion, and supported in a manner that the main housing 10 is pivotable relative to the vehicle body 100 about the pivoting center C at the first end portion, the movable column member 20 accommodated and supported in the main housing 10 in a movable manner in the front-rear direction of the vehicle body 100, the fixing bracket 30 fixing the second end portion of the main housing 10 to the vehicle body 100 in a state where the fixing bracket 30 supports the second end portion of the main housing 10 in a manner that the second end portion is movable in the up-down direction of the vehicle body 100 relative to the vehicle body 100, the link mechanism 4 including the first end portion and the second end portion, the first end portion of the link mechanism 4 being supported by the fixing bracket 30, and the drive mechanism 5 connected to the second end portion of the link mechanism 4, wherein the drive mechanism 5 includes the electric motor 60, the threaded shaft 62 pivotably supported by the second end portion of the main housing 10 and rotated by driving of the electric motor 60, and the nut member 50 moving in the axial direction of the threaded shaft 62 in response to the rotation of the threaded shaft 62, the nut member 50 is threadedly engaged with the threaded shaft 62, the nut member 50 includes the female threaded portion 51 including the two flat surface portions 51*a*, 51*b* which are positioned facing each other and are parallel to the threaded shaft 62, one of the two flat surface portions 51*a*, 51*b* is away from the central axis CL1 of the female threaded portion 51 of the nut member 50 by the first predetermined distance and the other one of the two flat surface portions 51*a*, 51*b* is away from the central axis CL1 by the second predetermined distance, the nut member 50 includes the pivot shaft portion 52 including the rotational axis P4 that is orthogonal to the axis of the female threaded portion 51, the link mechanism 4 includes at least one leg portion 423, 424, 425 provided at the second end portion of the link mechanism 4 and rotatably supporting the pivot shaft portion 52, and the link mechanism 4 includes the curved washer 71, 73 or the coil spring 72 arranged between the leg portion 423, 424, 425 and at least one of the two flat surface portions 51*a*, 51*b* of the female threaded portion 51, and pressing the female threaded portion 51 in the direction which is orthogonal to the axial direction of the threaded shaft 62.

According to the above described structure, the drive mechanism 5 of the steering apparatus of the embodiments includes the threaded shaft 62 pivotably supported by the second end portion of the main housing 10 and driven by the electric motor 60 to rotate, and the nut member 50 moving in the axial direction in response to the rotation of the threaded shaft 62. The nut member 50 includes the female threaded portion 51 threadedly engaged with the threaded shaft 62 and including the two flat surface portions 51*a*, 51*b* which are positioned facing each other and are parallel to the threaded shaft 62. One of the two flat surface portions 51*a*, 51*b* is away from the central axis CL1 of the female threaded portion 51 of the nut member 50 by the first predetermined distance and the other one of the two flat surface portions 51*a*, 51*b* is away from the central axis CL1 by the second predetermined distance. The nut member 50 includes the pivot shaft portion 52 including the rotational axis P4 that is orthogonal to the axis of the female threaded portion 51. The link mechanism 4 includes at least one leg portion 423, 424, 425 provided at the second end portion of the link mechanism 4 and rotatably supporting the pivot shaft portion 52. The link mechanism 4 includes the curved washer 71, 73 or the coil spring 72 arranged between the leg portion 423, 424, 425 and at least one of the two the flat surface portion 51*a*, 51*b* of the female threaded portion 51, and pressing the female threaded portion 51 in the direction which is orthogonal to the threaded shaft 62. Consequently, the embodiments include the simple configuration that is easy to assemble. Further, the shakiness or looseness between the threaded shaft 62 and the nut member 50 is restricted by using a smaller number of parts compared to conventional techniques. Therefore, the steering apparatus is provided at low costs.

According to the embodiments, the spring member 71, 73 corresponds to the curved washer 71, 73.

According to the embodiments, the curved washer 71 includes the annular cross-section, and is fitted around the pivot shaft portion 52 and retained thereat.

According to the embodiments, the curved washer 73 includes the cross-section having a U-shape, and is held at the pivot shaft portion 52 and retained thereat in a manner that the pivot shaft portion 52 is placed to fit within the U-shape.

According to the embodiments, the spring member 72 corresponds to the coil spring 72 wound around the pivot shaft portion 52 of the nut member 50.

According to the above described structures, the spring member is constituted by the curved washer 71 including the annular cross-section or by the curved washer 73 including the cross-section having the U-shape. Thus, the curved washer 71, 73 is easily retained at the link mechanism 4. The spring member may be constituted by the coil spring 72. Consequently, flexibility or freedom of design increases.

According to the embodiments, the link mechanism 4 includes the link member 42 including the pair of leg portions 423, 424 which face each other and each of which is provided with the bearing portion 423, 424, the axial end portions of the pivot shaft portion 52 of the nut member 50 are respectively supported at the pair of leg portions 423, 424, and the curved washer 71, 73 or the coil spring 72 is arranged between one of the leg portions 423, 424 and the corresponding flat surface portion 51*a*, 51*b* of the female threaded portion 51.

According to the above described structure, the embodiments include the simple configuration that is easy to assemble. Further, the shakiness or looseness between the threaded shaft 62 and the nut member 50 is restricted by using a smaller number of parts compared to conventional techniques. Therefore, the steering apparatus is provided at low costs.

According to the embodiments, the link mechanism 4 includes the link member 42*x* including the leg portion 425 provided with the bearing portion 425, the link mechanism 4 includes the plate 42*y* provided with the bearing portion 425 and arranged parallel to the leg portion 425 while the predetermined distance is provided between the plate 42*y* and the leg portion 425, the plate 42*y* and the leg portion 425 are arranged in a manner that the bearing portion 425 of the plate 42*y* and the bearing portion 425 of the leg portion 425 face each other, the axial end portions of the pivot shaft portion 52 of the nut member 50 are, between the plate 42*y* and the leg portion 425, supported at the bearing portion 425 of the plate 42*y* and at the bearing portion 425 of the leg portion 425 respectively, and the curved washer 71, 73 or the coil spring 72 is arranged between one of the bearing portion 425 of the plate 42*y* and the bearing portion 425 of the leg portion 425, and the corresponding flat surface portion 51*a* of the female threaded portion 51.

According to the above described structure, the link mechanism 4 includes one leg portion 425 and the plate 42*y* arranged parallel to the leg portion 425. Consequently, the link mechanism 4 is configured appropriately in accordance with a configuration of an object that is to be attached by means of the link mechanism 4.

According to the embodiments, the pivot shaft portion 52 of the nut member 50 includes the two flat surface portions 52*a*, 52*b* which are parallel to the rotational axis P4 and which face each other and are away from each other by the predetermined distance, and the curved washer 71 includes the protrusion 71*p*, 71*s* being in contact with at least one of the two flat surface portions 52*a*, 52*b* of the pivot shaft portion 52.

According to the above described structure, the rotation of the curved washer 71 relative to the pivot shaft portion 52 is restricted, and thus the stable elastic load is maintained.

According to the embodiments, the link mechanism 4 includes the cut-out portion 42*b* opening in the direction which is orthogonal to the rotational axis P4 of the pivot shaft portion 52 and including the two flat surfaces configured to be parallel to the two flat surface portions 52*a*, 52*b* of the pivot shaft portion 52.

According to the above described structure, a connecting structure connecting the drive mechanism 5 and the link mechanism 4 to each other includes a simple configuration that is easy to assemble. Further, the drive mechanism 5 and the link mechanism 4 are assembled easily by using a small number of parts. Thus, an assembling workload is reduced.

According to the embodiments, the electric motor 60 is arranged at the forward portion of the vehicle body 100 relative to the pivot shaft portion 52.

According to the above described structure, it is restricted that the electric motor 60 is in contact with the knees of the occupant of the vehicle.

According to the embodiments, the central axis CL1 of the female threaded portion 51 and the central axis CL2 of the threaded shaft 62 are offset from each other in a state where the threaded shaft 62 is threadedly engaged with the nut member 50 and where the curved washer 71, 73 or the coil spring 72 is arranged between the leg portion 423, 424, 425 and at least one of the flat surface portions 51*a*, 51*b* of the female threaded portion 51.

According to the above described structure, the steering apparatus of the embodiments includes the simple configuration that is easy to assemble. Further, the shakiness or looseness between the threaded shaft 62 and the nut member 50 is restricted by using a smaller number of parts compared to conventional techniques. Therefore, the steering apparatus is provided at low costs.

According to the embodiments, the first predetermined distance between one of the two flat surface portions 51*a*, 51*b* of the nut member 50 and the central axis CL1 of the female threaded portion 51 is equal to the second predetermined distance between the other one of the two flat surface portions 51*a*, 51*b* and the central axis CL1.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A steering apparatus for a vehicle provided with a steering wheel, the steering apparatus comprising:

a main housing including a first end portion and a second end portion, and supported in a manner that the main housing is pivotable relative to a vehicle body about a pivoting center at the first end portion;

a movable column member accommodated and supported in the main housing in a movable manner in a front-rear direction of the vehicle body;

a fixing bracket fixing the second end portion of the main housing to the vehicle body in a state where the fixing bracket supports the second end portion of the main housing in a manner that the second end portion is movable in an up-down direction of the vehicle body relative to the vehicle body;

a link mechanism including a first end portion and a second end portion, the first end portion of the link mechanism being supported by the fixing bracket; and a drive mechanism connected to the second end portion of the link mechanism, wherein the drive mechanism includes a motor, a threaded shaft pivotably supported by the second end portion of the main housing and rotated by driving of the motor, and a nut member moving in an axial direction of the threaded shaft in response to rotation of the threaded shaft, the nut member is threadedly engaged with the threaded shaft, the nut member includes a female threaded portion including two flat surface portions which are positioned facing each other and are parallel to the threaded shaft, one of the two flat surface portions is away from a central axis of the female threaded portion of the nut member by a first predetermined distance and the other one of the two flat surface portions is away from the central axis by a second predetermined distance, the nut member includes a pivot shaft portion including a rotational axis that is orthogonal to an axis of the female threaded portion, the link mechanism includes at least one bearing portion provided at the second end portion of the link mechanism and rotatably supporting the pivot shaft portion, and the link mechanism includes a spring member arranged between the bearing portion and at least one of the two flat surface portions of the female threaded portion, and pressing the female threaded portion in a direction which is orthogonal to the axial direction of the threaded shaft.

2. The steering apparatus for the vehicle according to claim 1, wherein the spring member is a curved washer.

3. The steering apparatus for the vehicle according to claim 2, wherein the curved washer includes an annular cross-section, and is fitted around the pivot shaft portion and retained on the pivot shaft portion.

4. The steering apparatus for the vehicle according to claim 2, wherein the curved washer includes a cross-section having a U-shape, and is held at the pivot shaft portion and retained on the pivot shaft portion in a manner that the pivot shaft portion is fit within the U-shape.

5. The steering apparatus for the vehicle according to claim 1, wherein the spring member is a coil spring wound around the pivot shaft portion of the nut member.

6. The steering apparatus for the vehicle according to claim 1, wherein the link mechanism includes a link member including a pair of leg portions which face each other and each of which is provided with the bearing portion, axial end portions of the pivot shaft portion of the nut member are respectively supported at the pair of bearing portions, and the spring member is arranged between one of the bearing portions and the corresponding flat surface portion of the female threaded portion.

7. The steering apparatus for the vehicle according to claim 1, wherein the link mechanism includes a link member including the leg portion provided with the bearing portion, the link mechanism includes a plate provided with the bearing portion and arranged parallel to the leg portion while a predetermined distance is provided between the plate and the leg portion, the plate and the leg portion are arranged in a manner that the bearing portion of the plate and the bearing portion of the leg portion face each other, axial end portions of the pivot shaft portion of the nut member are, between the plate and the leg portion, supported at the bearing portion of the plate and at the bearing portion of the leg portion respectively, and the spring member is arranged between one of the bearing portion of the plate and the bearing portion of the leg portion, and the corresponding flat surface portion of the female threaded portion.

8. The steering apparatus for the vehicle according to claim 1, wherein the pivot shaft portion of the nut member includes two flat surface portions which are parallel to the rotational axis and which face each other and are away from each other by a predetermined distance, and the spring member includes a contacting portion being in contact with at least one of the two flat surface portions of the pivot shaft portion.

9. The steering apparatus for the vehicle according to claim 8, wherein the link mechanism includes a cut-out portion opening in a direction which is orthogonal to the rotational axis of the pivot shaft portion and including two flat surfaces configured to be parallel to the two flat surface portions of the pivot shaft portion.

10. The steering apparatus for the vehicle according to claim 1, wherein the motor is arranged at a forward portion of the vehicle body relative to the pivot shaft portion.

11. The steering apparatus for the vehicle according to claim 1, wherein the central axis of the female threaded portion and a central axis of the threaded shaft are offset from each other in a state where the threaded shaft is threadedly engaged with the nut member and where the spring member is arranged between the bearing portion and at least one of the two flat surface portions of the female threaded portion.

12. The steering apparatus for the vehicle according to claim 1, wherein the first predetermined distance between one of the two flat surface portions of the nut member and the central axis of the female threaded portion is equal to the second predetermined distance between the other one of the two flat surface portions and the central axis.

* * * * *